`US010818184B2`

(12) United States Patent
Han et al.

(10) Patent No.: US 10,818,184 B2
(45) Date of Patent: Oct. 27, 2020

(54) APPARATUS AND METHOD FOR IDENTIFYING CLOSE CUT-IN VEHICLE AND VEHICLE INCLUDING APPARATUS

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si, Gyeonggi-do (KR)

(72) Inventors: Seul Ki Han, Seoul (KR); Su Min Jo, Namyang-eup (KR); Hoon Lee, Gunpo-si (KR); Sang Won Lee, Yongin-si (KR); Sung Woo Lee, Ulsan (KR); Jong Gwan Lee, Suwon-si (KR); Bong Sob Song, Seongnam-si (KR)

(73) Assignees: Hyundai Motor Company, Seoul (KR); Kia Motors Corporation, Seoul (KR); AJOU University Industry-Academic Cooperation Foundation, Suwon-si, Gyeonggi-do (KR)

( * ) Notice: Subject to any disclaimer, the term of this patent is extended or adjusted under 35 U.S.C. 154(b) by 193 days.

(21) Appl. No.: 16/215,113

(22) Filed: Dec. 10, 2018

(65) Prior Publication Data

US 2020/0118441 A1   Apr. 16, 2020

(30) Foreign Application Priority Data

Oct. 10, 2018  (KR) .................. 10-2018-0120628

(51) Int. Cl.
*G08G 1/16* (2006.01)
*G06N 20/00* (2019.01)
(Continued)

(52) U.S. Cl.
CPC ............ *G08G 1/166* (2013.01); *G01S 13/931* (2013.01); *G06N 20/00* (2019.01); *G08G 1/161* (2013.01);
(Continued)

(58) Field of Classification Search
CPC .......... G08G 1/16; G08G 1/166; G08G 1/161; G08G 1/167; G08G 1/164;
(Continued)

(56) References Cited

U.S. PATENT DOCUMENTS

2018/0354555 A1* 12/2018 Sheng ................ B62D 15/0265
2019/0025405 A1*  1/2019 Liu .......................... G01S 13/42
(Continued)

*Primary Examiner* — Tan Q Nguyen
(74) *Attorney, Agent, or Firm* — Morgan, Lewis & Bockius LLP

(57) ABSTRACT

A close cut-in vehicle identification apparatus includes an information generator configured to generate sensor fusion information, estimated vehicle state information, and risk determination information based on surrounding vehicle information upon receiving the surrounding vehicle information, a feature combination generator configured to extract a plurality of features based on the sensor fusion information, the estimated vehicle state information, and the risk determination information and to combine the extracted features to generate a plurality of feature combinations, a classification learner configured to classify and learn the plurality of feature combinations depending on a weight factor, and a vehicle intention determination device configured to determine intention of a surrounding vehicle based on a classification learning result value to select an optimum feature combination corresponding to identification of the close cut-in vehicle and configured to determine a situation of the close cut-in vehicle based on the selected optimum feature combination.

20 Claims, 14 Drawing Sheets

(51) Int. Cl.
*G01S 13/931* (2020.01)
*G01S 13/93* (2020.01)

(52) U.S. Cl.
CPC . *G01S 2013/932* (2020.01); *G01S 2013/9322* (2020.01)

(58) Field of Classification Search
CPC ....... G01S 2013/932; G01S 2013/9322; G01S 13/93; G01S 13/931
USPC ........................................................ 701/117
See application file for complete search history.

(56) References Cited

U.S. PATENT DOCUMENTS

2019/0152523 A1\* 5/2019 Hajika .................. B60W 30/12
2020/0055402 A1\* 2/2020 Camhi ..................... B60T 7/22

\* cited by examiner

FIG. 9

| $p_i$ | Combination of feature |
|---|---|
| 1 | (y) |
| ⋮ | ⋮ |
| 195 | $(y, v_y, I_{lat})$ |
| ⋮ | ⋮ |
| 519 | $(y, x, v_x, V, TTC, TLC)$ |
| ⋮ | ⋮ |
| N | $(y, x, v_y, v_x, \theta, I_{lat}, V, TTC, TLC, I_{long})$ |

FIG. 10

| Rank | A combination of features | Test | | w / ‖w‖$_2$ |
|---|---|---|---|---|
| | | TPR | FPR | |
| 415 | (y, v$_y$, I$_{lat}$) | 0.9795 | 0.0834 | [-0.6653;0.1506;0.7312] |
| 445 | (y, v$_y$,θ ,I$_{lat}$) | 0.9795 | 0.0839 | [-0.6941;0.1661; -0.1470;0.6848] |
| 739 | (I$_{lat}$, TTC, TLC, I$_{long}$) | 0.9785 | 0.0685 | [1.0000;-0.0000; -0.0000;0.0008] |
| 761 | (v$_y$, I$_{lat}$, TLC) | 0.9785 | 0.0678 | [0.0060;1.0000;-0.000002] |
| 776 | (v$_y$, θ , I$_{lat}$) | 0.9785 | 0.0675 | [0.0067;-0.0042;1.0000] |
| 869 | (v$_y$, θ , TLC) | 0.9712 | 0.0763 | [-0.3369;-0.9415;-0.00005] |

| Rank | A combination of features | Test | | $w / \|w\|_2$ |
|---|---|---|---|---|
| | | TPR | FPR | |
| 739 | $(I_{lat}, TTC, TLC, I_{long})$ | 0.9785 | 0.0685 | [1.0000;-0.0000;<br>-0.0000;0.0008] |
| 761 | $(v_y, I_{lat}, TLC)$ | 0.9785 | 0.0678 | [0.0060;1.0000;-0.0000002] |

FIG. 13

| Rank | A combination of features | Test | | w / ‖w‖$_2$ |
|---|---|---|---|---|
| | | TPR | FPR | |
| 445 | ($v$, $v_y$, $\theta$, $I_{lat}$) | 0.9795 | 0.0839 | [-0.6941;0.1661; -0.1470;0.6848] |
| 776 | ($v_y$, $\theta$, $I_{lat}$) | 0.9785 | 0.0675 | [0.0067;-0.0042;1.0000] |
| 869 | ($v_y$, $\theta$, TLC) | 0.9712 | 0.0763 | [-0.3369;-0.9415;-0.00005] |

APPARATUS AND METHOD FOR IDENTIFYING CLOSE CUT-IN VEHICLE AND VEHICLE INCLUDING APPARATUS

This application claims the benefit of Korean Patent Application No. 10-2018-0120628, filed on Oct. 10, 2018 in the Korean Intellectual Property Office, which is hereby incorporated by reference as if fully set forth herein.

TECHNICAL FIELD

The present disclosure relates to a close cut-in vehicle identification apparatus, and more particularly, to an apparatus and a method for identifying a close cut-in vehicle, and a vehicle using the method, for selecting an optimum feature combination for identification of a close cut-in vehicle to accurately determine various situations based on the selected optimum feature combination with respect to another vehicle that cuts in at a short distance during low-velocity driving.

BACKGROUND

In general, vehicles have been developed as intelligent vehicles for providing enhanced safety and convenience using developed information communication technologies as well as enhancing fuel efficiency and performance as a transport device.

However, since an intelligent vehicle includes additional functions such as an entertainment system, an air filter, and a convenience device, a driver needs to manipulate other additional manipulation devices as well as a manipulation device for driving and, thus, there is increasing accident risk due to driver careless.

Accordingly, recently, research has been conducted in various ways into a safety device for preventing or avoiding vehicle collision.

Vehicle collision avoidance apparatuses include an adaptive cruise control system, a forward vehicle collision warning system, a lane departure warning system, and so on, and these vehicle collision avoidance apparatuses are mainly used in the case of high-velocity traveling to prevent serious accidents and most of the technologies used by the vehicle collision avoidance apparatuses relate to detection of obstacles at a long distance in the case of high-velocity traveling.

However, with regard to most of actual traffic accidents, 70% or greater of the accidents are mainly caused at low velocity equal to or less than about 30 km/h due to congested traffic characteristics in cities and, thus, a conventional collision avoidance apparatus is not appropriate to accurately recognize another vehicle that cuts in at a short distance during low-velocity driving and to prevent collision.

For example, when another vehicle cuts in at a short distance during low-velocity driving, a subject vehicle is not capable of accurately recognizing corner radar information due to noise included in the corner radar information or is not capable of accurately recognizing a situation of another vehicle that cuts in at a short distance during low-velocity driving due to coasting and, thus, misjudges the situation and collides with another vehicle.

Accordingly, there is a need for an apparatus for identifying a close cut-in vehicle for preventing collision to enhance safety by selecting an optimum feature combination for identification of a close cut-in vehicle and accurately determining various situations of another vehicle that cuts in at a short distance during low-velocity driving.

SUMMARY

An object of the present disclosure is to provide an apparatus and a method for identifying a close cut-in vehicle, and a vehicle using the method, for selecting an optimum feature combination for identification of a close cut-in vehicle to accurately determine various situations based on the selected optimum feature combination with respect to another vehicle that cuts in at a short distance during low-velocity driving.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a close cut-in vehicle identification apparatus includes an information generator configured to generate sensor fusion information, estimated vehicle state information, and risk determination information based on surrounding vehicle information upon receiving the surrounding vehicle information, a feature combination generator configured to extract a plurality of features based on the sensor fusion information, the estimated vehicle state information, and the risk determination information and to combine the extracted features to generate a plurality of feature combinations, a classification learner configured to classify and learn the plurality of feature combinations depending on a weight factor, and a vehicle intention determination device configured to determine intention of a surrounding vehicle based on a classification learning result value provided by the classification learner to select an optimum feature combination corresponding to identification of the close cut-in vehicle and configured to determine a situation of the close cut-in vehicle based on the selected optimum feature combination.

Here, the information generator may receive surrounding vehicle information including track information from a front radar for sensing a front side of a subject vehicle and may receive surrounding vehicle information including track information and free space information from a corner radar for sensing a corner side of the subject, upon receiving surrounding vehicle information.

The information generator may generate first sensor fusion information obtained via fusion of front radar track information and corner radar track information of the surrounding vehicle information and second sensor fusion information obtained via fusion of front radar track information, corner radar track information, and corner radar free space information of the surrounding vehicle information, when generating the sensor fusion information.

The first sensor fusion information may include a lateral position of a fusion track, a longitudinal position of the fusion track, lateral relative velocity of the fusion track, longitudinal relative velocity of the fusion track, a heading angle of a corner radar, a width of the fusion track, a length of the fusion track, and absolute velocity of a corner radar track.

The second sensor fusion information may include a lateral position of a fusion track, a longitudinal position of the fusion track, lateral relative velocity of the fusion track, longitudinal relative velocity of the fusion track, a heading angle of a corner radar, a width of a corner radar track, and a length of the corner radar track.

Then, the information generator may estimate lateral relative velocity of a corner radar track and longitudinal relative velocity of the corner radar track to calculate an estimated value and generates the estimated vehicle state information including the calculated estimated value, when generating the estimated vehicle state information.

Here, the estimated vehicle state information may include an estimated value of the lateral relative velocity of the corner radar track and an estimated value of the longitudinal relative velocity of the corner radar track.

Then, the information generator may calculate a longitudinal collision risk index based on time to collision (TTC) and a warning index, may calculate a lateral collision risk index based on time to lane crossing (TLC) and a longitudinal collision risk index, and may generate the risk determination information including the calculated longitudinal collision risk index and lateral collision risk index, when generating the risk determination information.

Here, the information generator may calculate the time to collision (TTC) based on a clearance between another vehicle and a subject vehicle and the longitudinal relative velocity of the another vehicle, may calculate a warning index based on a clearance between two vehicles, a brake threshold distance, and a warning threshold distance, and may calculate a longitudinal collision risk index based on the calculated time to collision (TTC) and warning index, a preset threshold value of the time to collision (TTC), and a maximum value of the warning index when calculating the longitudinal collision risk index.

The information generator may calculate time to lane crossing (TLC) based on a lateral position of another vehicle and lateral relative velocity of the another vehicle and may calculate a lateral collision risk index based on the time to lane crossing (TLC), the longitudinal collision risk index, and a preset threshold value of the time to lane crossing (TLC), when calculating the lateral collision risk index.

Then, the feature combination generator may extract a lateral position of a fusion track, a longitudinal position of the fusion track, a heading angle of a corner radar, and absolute velocity of a corner radar track from the sensor fusion information, may extract features including an estimated value of lateral relative velocity of a corner radar track and an estimated value of longitudinal relative of the corner radar track from the estimated vehicle state information, and may extract features including time to collision (TTC), a longitudinal collision risk index, time to lane crossing (TLC), and a lateral collision risk index from the risk determination information, when extracting the plurality of features.

The vehicle intention determination device may determine intention of the surrounding vehicle based on the classification learning result value, may calculate accuracy of close cut-in with respect to the determined intention of the surrounding vehicle, may select an optimum feature combination based on the calculated accuracy, and may determine a situation of the close cut-in vehicle based on a weight factor included in the selected optimum feature combination, when selecting an optimum feature combination corresponding to identification of the close cut-in vehicle.

The vehicle intention determination device may calculate the accuracy of the close cut-in based on a true positive rate (TPR) and a false positive rate (FPR), when calculating the accuracy of the close cut-in with respect to the intention of the surrounding vehicle.

In another aspect of the present disclosure, a method of identifying a close cut-in vehicle of a close cut-in vehicle identification apparatus includes receiving surrounding vehicle information, upon receiving the surrounding vehicle information, generating sensor fusion information, estimated vehicle state information, and risk determination information based on the received surrounding vehicle information, generating a plurality of features based on the sensor fusion information, the estimated vehicle state information, and the risk determination information, combining the extracted features to generate a plurality of feature combinations, classifying and learning the plurality of feature combinations depending on a weight factor, determining intention of a surrounding vehicle based on a classification learning result value to select an optimum feature combination corresponding to identification of a close cut-in vehicle, and determining determine a situation of the close cut-in vehicle based on the selected optimum feature combination.

In another aspect of the present disclosure, a computer readable recording medium having recorded thereon a program for executing the method identifying a close cut-in vehicle of a close cut-in vehicle identification apparatus.

In another aspect of the present disclosure, a vehicle including a sensing device configured to sense a surrounding vehicle, and a close cut-in vehicle device configured to identify a close cut-in vehicle based on surrounding vehicle information received from the sensing device, wherein the close cut-in vehicle device generates sensor fusion information, estimated vehicle state information, and risk determination information based on the received surrounding vehicle information, extracts a plurality of features based on the sensor fusion information, the estimated vehicle state information, and the risk determination information, combines the extracted features to generate a plurality of feature combinations, classifies and learns the plurality of feature combinations depending on a weight factor, determines intention of a surrounding vehicle based on a classification learning result value to select an optimum feature combination corresponding to identification of the close cut-in vehicle, and determines a situation of the close cut-in vehicle based on the selected optimum feature combination.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 9 is a diagram for explanation of generation of a feature combination of the feature combination device of FIG. 1;

FIG. 10 is a diagram for explanation of selection of an optimum feature combination of the vehicle intention determination device of FIG. 1;

FIGS. 11 through 13 are diagrams for explanation of selection of an optimum feature combination depending on a close cut-in situation.

DETAILED DESCRIPTION

Figure 1:
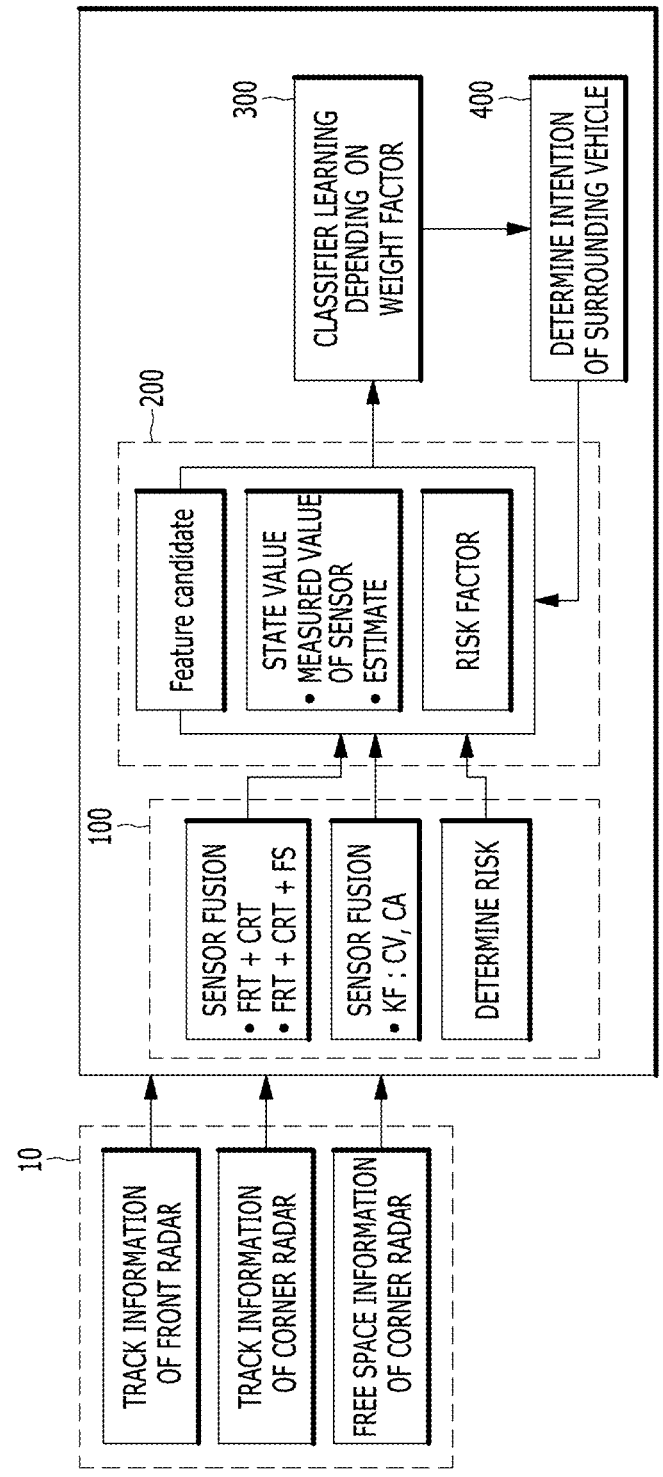
FIG. 1 is a schematic block diagram for explanation of a close cut-in vehicle identification apparatus according to the present disclosure.

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, an apparatus and method for identification of a close cut-in vehicle and a vehicle using the same, applicable to embodiments of the present disclosure, are described in detail with reference to FIGS. 1 through 14.

FIG. 1 is a schematic block diagram for explanation of a close cut-in vehicle identification apparatus according to the present disclosure.

Referring to FIG. 1, the close cut-in vehicle identification apparatus according to the present disclosure may include an information generator 100, a feature combination generator 200, a classification learner 300, and a vehicle intention determination device 400.

Upon receiving surrounding vehicle information from a sensing device 10, the information generator 100 may generate may generate sensor fusion information, estimated vehicle state information, and risk determination information based on the received surrounding vehicle information.

Here, when receiving the surrounding vehicle information, the information generator 100 may receive the surrounding vehicle information from a front radar of the sensor 10 for sensing a front side of a subject vehicle and a corner radar of the sensor 10 for sensing a corner side of the subject vehicle.

For example, upon receiving the surrounding vehicle information, the information generator 100 may receive the surrounding vehicle information including track information from the front radar and may receive the surrounding vehicle information including track information and free space information from the corner radar.

When generating the sensor fusion information, the information generator 100 may generate first sensor fusion information obtained via fusion of front radar track information and corner radar track information of the surrounding vehicle information and second sensor fusion information obtained by fusion of front radar track information, corner radar track information, and corner radar free space information of the surrounding vehicle information.

Here, when generating the first sensor fusion information, the information generator 100 may verify a position of the corner radar based on a position of the front radar, may correct the position of the corner radar toward a position of the front radar to calculate a fusion track, and may generate the first sensor fusion information including the calculated fusion track.

For example, the first sensor fusion information may include a lateral position of the fusion track, a longitudinal position of the fusion track, lateral relative velocity of the fusion track, longitudinal relative velocity of the fusion track, a heading angle of the corner radar, a width of the fusion track, a length of the fusion track, and absolute velocity of the corner radar track, without being limited thereto.

When generating the second sensor fusion information, the information generator 100 may calculate the fusion track via fusion of the free space and the corner radar track to generate the second sensor fusion information including the calculated fusion track.

Here, during fusion of the free space and the corner radar track, the information generator 100 may perform fusion based on a particle filter, but the present disclosure is not limited thereto.

For example, the second sensor fusion information may include a lateral position of the fusion track, a longitudinal position of the fusion track, lateral relative velocity of the fusion track, longitudinal relative velocity of the fusion track, a heading angle of the corner radar, a width of the corner radar track, and a length of the corner radar track, without being limited thereto.

Then, when generating the estimated vehicle state information, the information generator 100 may estimate lateral relative velocity of the corner radar track and longitudinal relative velocity of the corner radar track to calculate an estimated value and may generate the estimated vehicle state information including the calculated estimated value.

Here, when estimating the lateral relative velocity of the corner radar track and the longitudinal relative velocity of the corner radar track, the information generator 100 may perform estimation based on the Kalman filter to calculate the estimated value, but the present disclosure is not limited thereto.

For example, the estimated vehicle state information may include an estimated value of the lateral relative velocity of the corner radar track and an estimated value of the longitudinal relative velocity of the corner radar track, but the present disclosure is not limited thereto.

When the information generator 100 generates the estimated vehicle state information, if surrounding vehicle state information is not received or surrounding vehicle state information including noise is received, the information generator 100 may generate the estimated vehicle state information.

Then, when generating the risk determination information, the information generator 100 may calculate a longitudinal collision risk index based on time to collision (TTC) and a warning index, may calculate a lateral collision risk index based on time to lane crossing (TLC) and the longitudinal collision risk index, and may generate risk determination information including the calculated longitudinal collision risk index and lateral collision risk index.

Here, when calculating the longitudinal collision risk index, the information generator 100 may calculate the time to collision (TTC) based on a clearance between a subject vehicle and another vehicle and lateral relative velocity of another vehicle, may calculate the warning index based on the clearance between the two distances, a brake threshold distance, and a warning threshold distance, and may calculate the longitudinal collision risk index based on the calculated time to collision (TTC) and warning index, and a preset threshold value of time to collision (TTC) and a maximum value of a warning index.

For example, when calculating the warning index, the information generator 100 may calculate the warning index as a positive value to provide information indicating that a current situation is safe when a clearance between two vehicles is greater than a warning threshold distance.

When presetting a threshold value of time to collision (TTC), the information generator 100 may set the threshold value to a threshold value corresponding to a condition in which another vehicle travels at low velocity equal to or less than about, for example, 10 kph (10 kph and other values/parameters described below are as an example, and the values/parameters are not limited thereto).

For example, the information generator 100 may set the threshold value of time to collision (TTC) to about 3, but the present disclosure is not limited thereto.

The threshold value is set as described above because the threshold value of time to collision (TTC) is set at vehicle velocity equal to or less than about, for example, 10 kph based on the fact that the threshold value of time to collision (TTC) is about, for example, 0.6 to 0.7 at vehicle velocity of about, for example, 50 kph.

When presetting the maximum value of the warning index, the information generator 100 may set the maximum value of the warning index in such a way that a variation rate of a longitudinal collision risk index corresponding to a variation rate of the warning index is greater than a reference value.

For example, the information generator 100 may preset the maximum value of the warning index to about, for example, 8.

The maximum value of the warning index is set as described above because, when an excessively high value is set as a tuning parameter, the tuning parameter is not sensitive to a change in a warning index of the longitudinal collision risk index.

For example, the longitudinal collision risk index has a tendency of being increased along with increase in the maximum value of the warning index.

When calculating the lateral collision risk index, the information generator 100 may calculate time to lane crossing (TLC) based on the lateral position of another vehicle and lateral relative velocity of another vehicle and may calculate a lateral collision risk index based on the time to lane crossing (TLC), the longitudinal collision risk index, and a preset threshold value of the time to lane crossing (TLC).

Here, when presetting the threshold value of the time to lane crossing (TLC), the information generator 100 may set a threshold value corresponding to a condition in which another vehicle is driven at low velocity equal to or less than about, for example, 10 kph.

When presetting the threshold value of the time to lane crossing (TLC), the information generator 100 may set the threshold value of the time to lane crossing (TLC) to a smaller threshold value than the threshold value of the time to collision (TTC).

For example, the information generator 100 may preset the threshold value of the time to lane crossing (TLC) to about, for example, 1.5.

The threshold value of the time to lane crossing (TLC) is set because the threshold value is more conservatively set to be lower than the threshold value of the time to collision (TTC) to identify close cut-in that largely affects lateral movement at vehicle velocity equal to or less than about, for example, 10 kph.

When calculating the lateral collision risk index, the information generator 100 may provide information indicating that a current situation is more dangerous as the calculated lateral collision risk index approaches a value of 1 and may also provide information indicating that a current situation is safer as the calculated lateral collision risk index approaches a value of 0.

The feature combination generator 200 may extract a plurality of features based on the sensor fusion information, the estimated vehicle state information, and the risk determination information and may combine the extracted features to generate a plurality of feature combinations.

When extracting the plurality of features, the feature combination generator 200 may extract features including a lateral position of fusion track, a longitudinal position of the fusion track, a heading angle of a corner radar, and absolute velocity of corner radar track from the sensor fusion information, may extract features including an estimated value of lateral relative velocity of corner radar track and an estimated value of longitudinal relative velocity of corner radar track from estimated vehicle state information, and may extract features including time to collision (TTC), longitudinal collision risk index, time to lane crossing (TLC), and the lateral collision risk index from the risk determination information.

When the feature combination generator 200 generates a plurality of feature combinations, feature combinations may include different numbers of features.

For example, the number of feature combinations may be changed depending on a total number of the extracted features.

Then, the classification learner 300 may classify and learn a plurality of feature combinations depending on a weight factor.

For example, the classification learner 300 may be a classifier, may use a soft margin support vector machine, and may use a feature candidate as a factor of a support vector machine (SVM) for classification learning.

The weight factor may be a tuning parameter which means that a support vector machine (SVM) applies a weight factor to any side of maximization of a clearance between different data and allowance of a degree by which learning data deviates from each class.

Then, the vehicle intention determination device 400 may determine intention of another vehicle based on a classification learning result value to select an optimum feature combination corresponding to identification of a close cut-in vehicle and may determine a situation of the close cut-in vehicle based on the selected optimum feature combination.

Here, when selecting the optimum feature combination corresponding to identification of the close cut-in vehicle, the vehicle intention determination device 400 may determine intention of a surrounding vehicle based on the classification learning result value, calculate accuracy of close cut-in with respect to the determined intention of the surrounding vehicle, may select an optimum feature combination based on the calculated accuracy, and may determine a situation of the close cut-in vehicle based on a weight factor included in the selected optimum feature combination.

For example, when calculating the accuracy of close cut-in with respect to intention of a surrounding vehicle, the vehicle intention determination device 400 may calculate the accuracy based on a true positive rate (TPR) and a false positive rate (FPR). When selecting the optimum feature combination based on the calculated accuracy, the vehicle intention determination device 400 may select a feature combination with a high true positive rate (TPR) and a low false positive rate (FPR).

According to the present disclosure as described above, information of a surrounding vehicle of a subject vehicle may be received through a front radar track, a corner radar track, and a free space, sensor fusion information (a relative position, relative velocity, a heading angle, and absolute velocity) using the information received from each sensor, state information (lateral and longitudinal relative velocity) estimated with respect to a noisy measurement result even if the information is or is not output from the sensor, and risk determination algorithm information may be generated, and an optimum feature combination for determination of intention of a surrounding vehicle may be selected while a combination of the three information items and the weight factor of a soft margin SVM via repetition.

Accordingly, according to the present disclosure, an optimum feature combination for identification of a close cut-in vehicle may be selected and various situations with respect to another close cut-in vehicle during low-velocity driving may be accurately determined based on the selected optimum feature combination to prevent collision and enhance safety.

According to the present disclosure, when a maneuver of a surrounding vehicle is determined using a machine learning method in situations of tight cut-in, loose cut-in, and mild cut-in of a vehicle at low velocity, it may be possible to select a required optimum feature combination and a classifier parameter.

Here, the tight cut-in situation may refer to a situation in which another vehicle cuts in around a head lamp of a subject vehicle when a clearance between a front vehicle and the subject vehicle is small, the loose cut-in situation may refer to a situation in which another vehicle cuts in around a front vehicle when a clearance between a front vehicle and the subject vehicle is large, and the mild cut-in situation may refer to a situation in which another vehicle cuts in a space between the subject vehicle and a front vehicle when a clearance between the front vehicle and the subject vehicle is large. Determination whether the clearance is small, larger, or mild, may be based on a comparison of the clearance of with first and second preset threshold values. For example, when the clearance is smaller than the first preset threshold value, the clearance is determined to be small; when the clearance is greater than the second preset threshold value which is greater than the first threshold value, the clearance is determined to be large; and when the clearance is between the first and second preset threshold values, the clearance is determined to be mild.

According to the present disclosure, even if an algorithm of a sensor fusion module, an estimation module, and a risk determination module of an entire system configuration are changed, it may be possible to apply the proposed framework.

Figure 2:
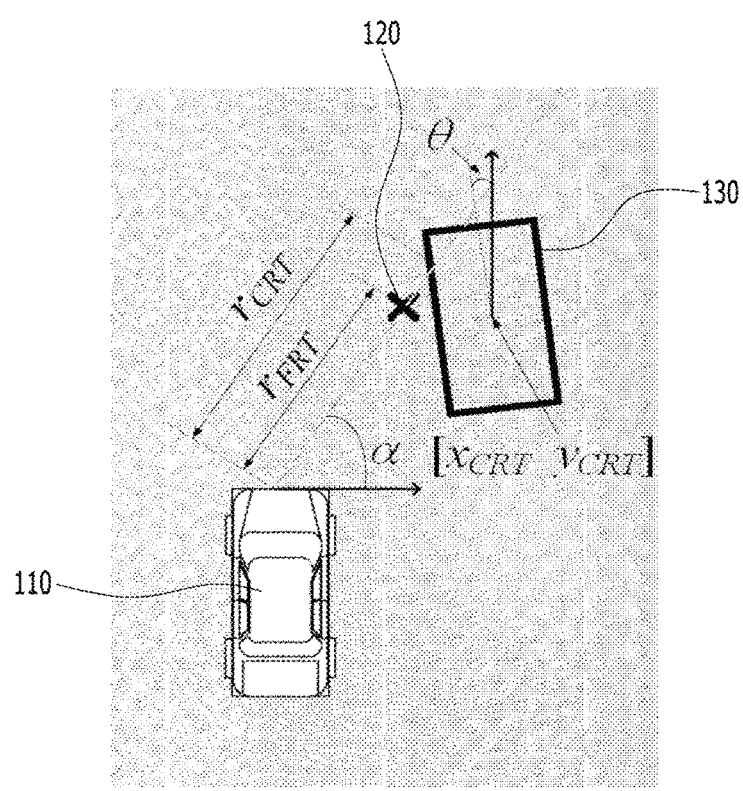
FIGS. 2 through 4 are diagrams for explanation of generation of sensor fusion information of an information generator of FIG. 1.
Figure 3:
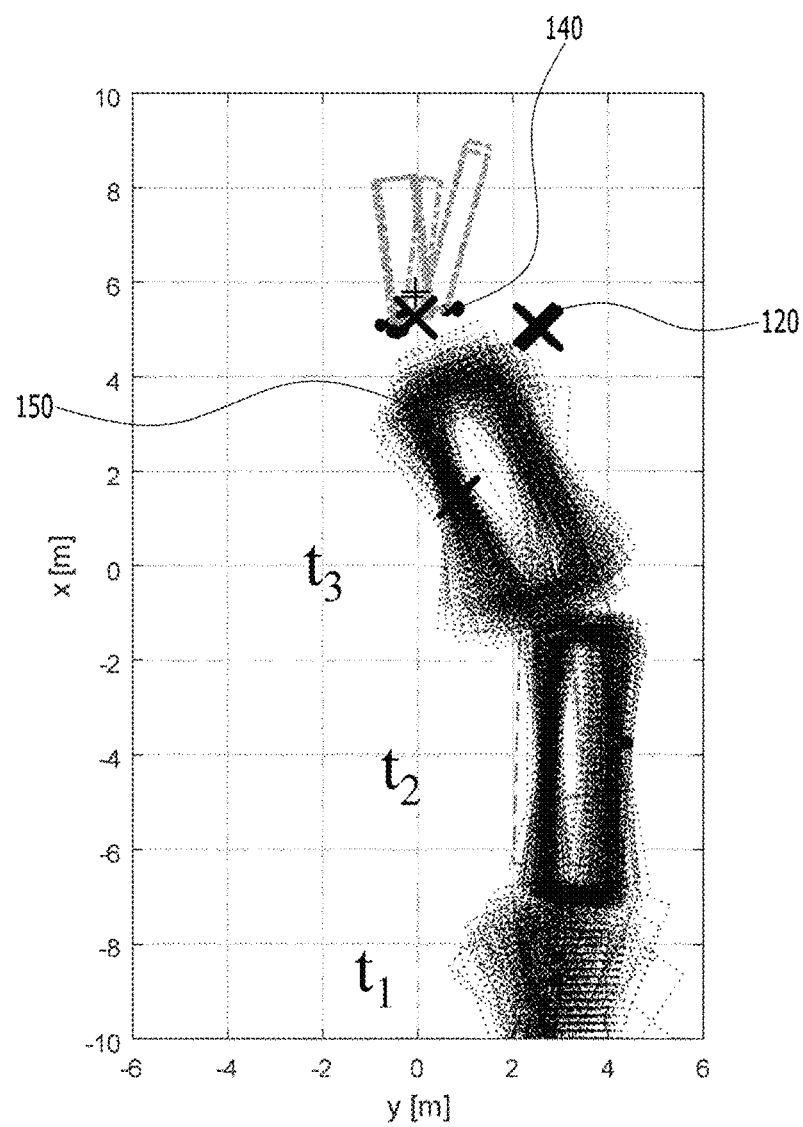
Figure 4:
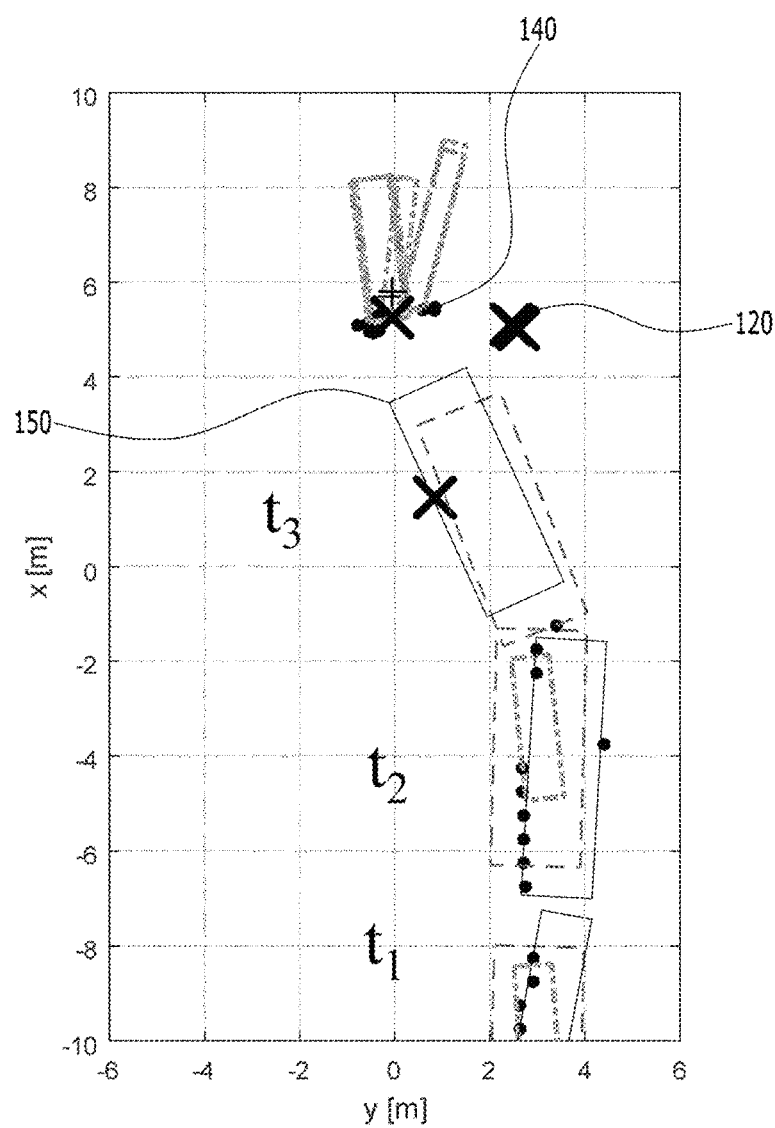
Figure 5:
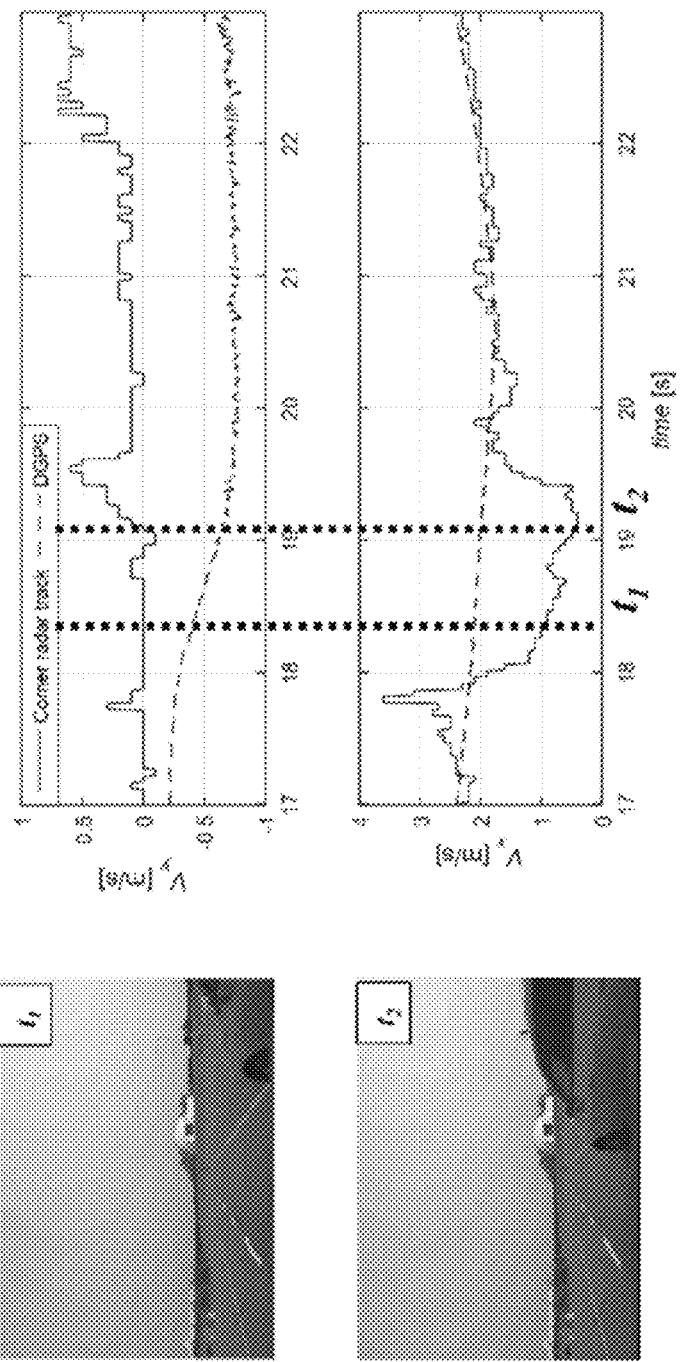
FIG. 5 is a diagram for explanation of generation of estimated vehicle state information of the information generator of FIG. 1.
Figure 6:
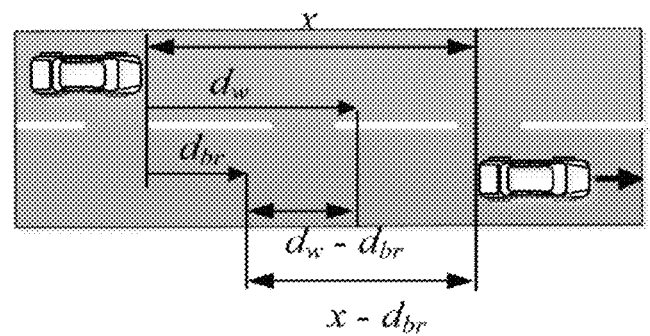
FIGS. 6 through 8 are diagrams for explanation of generation of risk determination information of the information generator of FIG. 1.
Figure 7:
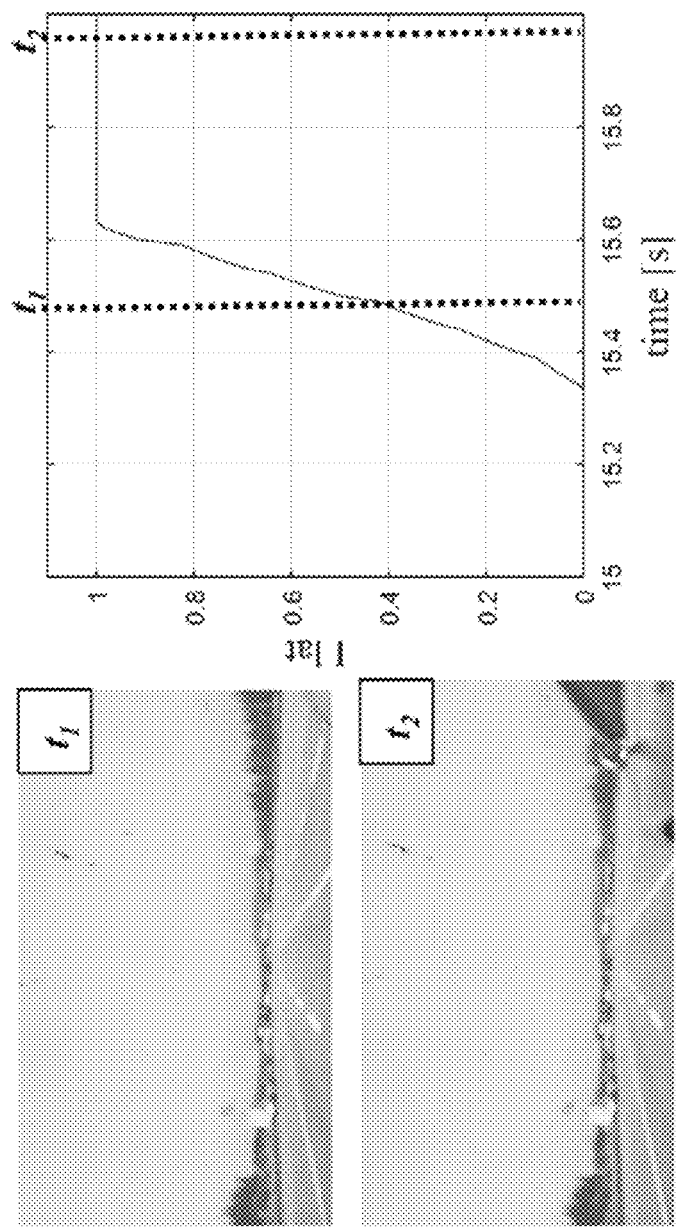
Figure 8:
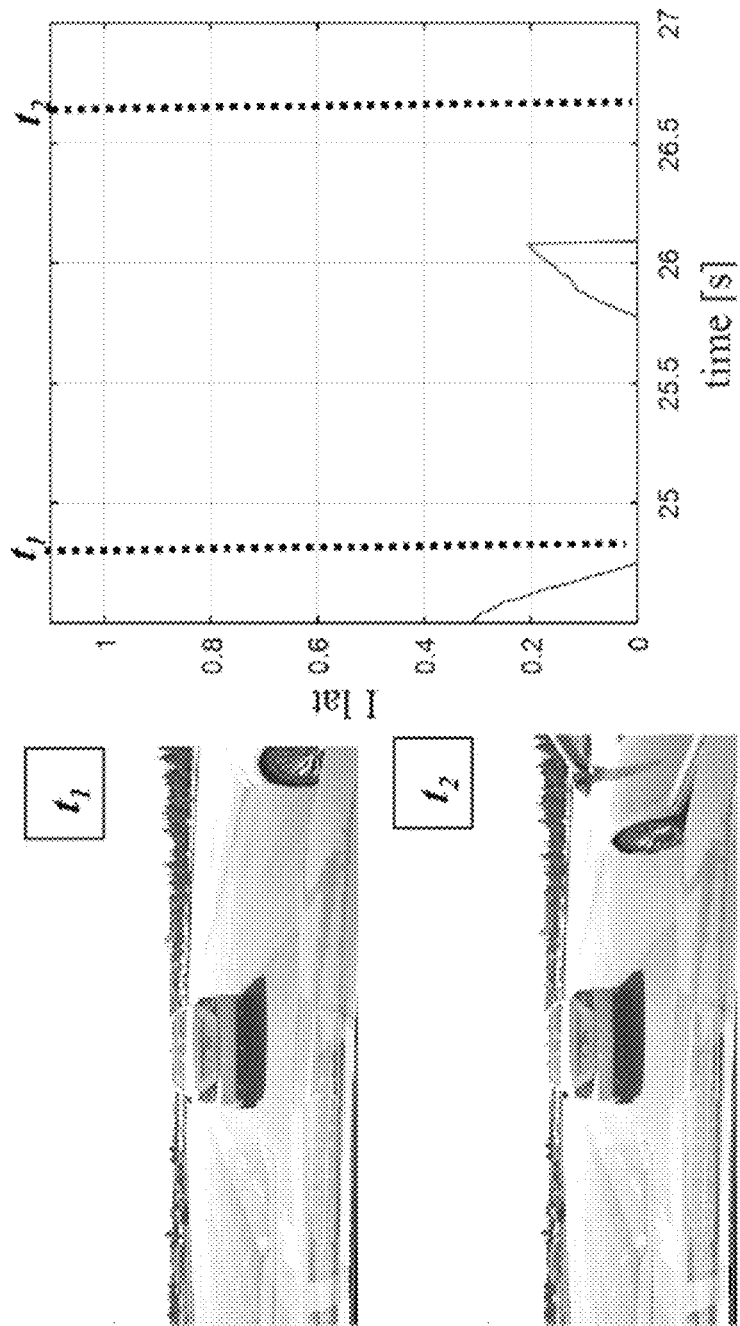

FIGS. 2 through 4 are diagrams for explanation of generation of sensor fusion information of the information generator of FIG. 1. FIG. 5 is a diagram for explanation of generation of estimated vehicle state information of the information generator of FIG. 1. FIGS. 6 through 8 are diagrams for explanation of generation of risk determination information of the information generator of FIG. 1.

As shown in FIGS. 2 through 8, upon receiving surrounding vehicle information from the sensing unit, the information generator according to the present disclosure may generate the sensor fusion information, the estimated vehicle state information, and the risk determination information based on the received surrounding vehicle information.

Here, when receiving the surrounding vehicle information, the information generator may receive the surrounding vehicle information from the front radar for sensing a front side of a subject vehicle and the corner radar for sensing a corner side of the subject vehicle.

For example, when receiving the surrounding vehicle information, the information generator may receive surrounding vehicle information including track information from the front radar and may receive the surrounding vehicle information including track information and free space information from the corner radar.

As shown in FIGS. 2 through 4, when generating the sensor fusion information, the information generator may generate first sensor fusion information obtained via fusion of the front radar track information and the corner radar track information of the surrounding vehicle information and second sensor fusion information obtained by fusion of the front radar track information, the corner radar track information, and the corner radar free space information of the surrounding vehicle information.

Here, as shown in FIG. 2, when generating the first sensor fusion information, the information generator may verify a position of the corner radar track based on a position of the front radar track, may correct the position of the corner radar track toward a position of the front radar track to calculate fusion track, and may generate the first sensor fusion information including the calculated fusion track.

For example, the first sensor fusion information may include a lateral position of the fusion track, a longitudinal position of the fusion track, lateral relative velocity of the fusion track, longitudinal relative velocity of the fusion track, a heading angle of the corner radar, a width of the fusion track, a length of the fusion track, and absolute velocity of the corner radar track, without being limited thereto.

That is, the first sensor fusion information may be obtained via fusion of the front radar and the corner radar and may be formed by correcting the position of the corner radar track toward the position of the front radar when the corner radar is present via norm gating based on the front radar track.

A state value except for a track position may be used as a value of the corner radar track.

Output of the fusion track may include a lateral position (y) of the fusion track, a longitudinal position (x) of the fusion track, lateral relative velocity ($v_y$) of the fusion track, longitudinal relative velocity ($v_x$) of the fusion track, a heading angle ($\theta$) of the corner radar track, a width of the fusion track, a length of the fusion track, and absolute velocity (V) of the corner radar track.

That is, output of fusion track: {y, x, $v_y$, $v_x$, $\theta$, width, length, V}

For example, as shown in FIG. 2, the first sensor fusion information may be calculated according to the following expressions.

$$X_{CRT} = [x_{CRT}\ y_{CRT}]$$

$$dr = r_{FRT} - r_{CRT}$$

$$dX = dr[\cos\alpha\ \sin\alpha]^T$$

$$X_{Fusion} = X_{CRT} + dX$$

| Variable | Description |
| --- | --- |
| $X_{CRT}$ | longitudinal position of corner radar |
| $Y_{CRT}$ | lateral position of corner radar |
| $\theta$ | heading angle of corner radar |
| $r_{CRT}$ | distance to side surface of corner radar track |
| $r_{FRT}$ | distance to front radar track |
| $\alpha$ | azimuth angle of front radar |
| y | lateral position of fusion track |
| x | longitudinal position of fusion track |
| $v_y$ | lateral relative velocity of fusion track |
| $v_x$ | longitudinal relative velocity of fusion track |
| v | absolute velocity of corner data track |

As shown in FIGS. 3 and 4, when generating the second sensor fusion information, the information generator 100 may calculate the fusion track via fusion of the free space and the corner radar track and may generate the second sensor fusion information including the calculated fusion track.

Here, during fusion of the free space and the corner radar track, the information generator 100 may perform fusion based on a particle filter, but the present disclosure is not limited thereto.

For example, the second sensor fusion information may include a lateral position of the fusion track, a longitudinal position of the fusion track, lateral relative velocity of the fusion track, the longitudinal relative velocity of the fusion track, a heading angle of the corner radar, a width of the corner radar track, and a length of the corner radar track, but the present disclosure is not limited thereto.

That is, the second sensor fusion information may be obtained via fusion of the front radar, the corner radar, and the free space.

FIG. 3 is a diagram showing a particle of a fusion algorithm of a close cut-in vehicle. FIG. 4 is a diagram showing a result of an expected value of a fusion algorithm of a close cut-in vehicle. As shown in FIGS. 3 and 4, a particle filter may be used for fusion of a free space output as a plurality of points and a corner radar output as a quadrangle.

Here, output of the fusion track may include a lateral position (y) of the fusion track, longitudinal position (x) of the fusion track, lateral relative velocity ($v_y$) of the fusion track, longitudinal relative velocity ($v_x$) of the fusion track, a heading angle ($\theta$) of the corner radar track, a width of the fusion track, and a length of the fusion track.

That is, output of fusion track: {y, x, $v_y$, $v_x$, $\theta$, width, length}

As shown in FIG. 5, when generating the estimated vehicle state information, the information generator may estimate lateral relative velocity of the corner radar track and longitudinal relative velocity of the corner radar track to calculate an estimated value and may generate the estimated vehicle state information including the calculated estimated value.

Here, when estimating the lateral relative velocity and the corner radar track and the longitudinal relative velocity of the corner radar track, the information generator may perform estimation based on the Kalman filter to calculate the estimated value, but the present disclosure is not limited thereto.

For example, the estimated vehicle state information may include an estimated value of the lateral relative velocity of the corner radar track and an estimated value of the longitudinal relative velocity of the corner radar track, but the present disclosure is not limited thereto.

When the information generator generates the estimated vehicle state information, if surrounding vehicle state information is not received or surrounding vehicle state information including noise is received, the information generator may generate the estimated vehicle state information.

FIG. 5 is a diagram showing lateral and longitudinal relative velocity error and noise of a corner radar track and, as shown in FIG. 5, a state value that is not output from a sensor or is output but is noisy may be replaced with a Kalman filter (KF)-based estimated value.

The information generator may use various models such as constant velocity and constant acceleration when estimating relative velocity.

The information generator may use an estimated value of lateral relative velocity ($v_y$) and longitudinal relative velocity ($v_x$) as the estimated vehicle state information.

Then, as shown in FIGS. 6 through 8, when generating the risk determination information, the information generator calculate a longitudinal collision risk index based on time to collision (TTC) and a warning index, may calculate a lateral collision risk index based on time to lane crossing (TLC) and the longitudinal collision risk index, and may generate risk determination information including the calculated longitudinal collision risk index and lateral collision risk index.

Here, when calculating the longitudinal collision risk index, the information generator may calculate the time to collision (TTC) based on a clearance between a subject vehicle and another vehicle and longitudinal relative velocity of another vehicle, may calculate a warning index based on a clearance between the two vehicles, a brake threshold distance, and a warning threshold distance, and may calculate a longitudinal collision risk index based on the calculated time to collision (TTC) and warning index and a preset threshold value of time to collision (TTC) and a maximum value of the warning index.

For example, when calculating the warning index, the information generator may calculate the warning index as a positive value to provide information indicating that a current situation is safe when a clearance between two vehicles is greater than the warning threshold distance.

When presetting the threshold value of time to collision (TTC), the information generator may set a threshold value corresponding to a condition in which another vehicle travels at low velocity equal to or less than about, for example, 10 kph.

For example, the information generator may preset the threshold value of time to collision (TTC) to about, for example, 3, but the present disclosure is not limited thereto.

The threshold value is set as described above because the threshold value of time to collision (TTC) is set to velocity equal to or less than about, for example, 10 kph based on the fact that the threshold value of time to collision (TTC) is about, for example, 0.6 to 0.7 at vehicle velocity of about, for example, 50 kph.

When presetting the maximum value of the warning index, the information generator may set the maximum value of the warning index in such a way that a variation rate of a longitudinal collision risk index corresponding to a variation rate of the warning index is greater than a reference value.

For example, the information generator may preset the maximum value of the warning index to about, for example, 8.

The maximum value of the warning index is set as described above because, when an excessively high value is set as a tuning parameter, the tuning parameter is not sensitive to a change in a warning index of the longitudinal collision risk index.

For example, the longitudinal collision risk index has a tendency of being increased along with increase in the maximum value of the warning index.

For example, as shown in FIG. 6, the longitudinal collision risk index may calculate the following expressions.

Time to collision (TTC):

$$TTC = \frac{x}{v_{rel}}$$

Warning index ($x_p$):

$$x_p = \frac{p_{long} - d_{br}}{d_w - d_{br}}$$

Breaking-critical distance ($d_{br}$):

$$d_{br} = v_{rel} \cdot t_{brake} - \frac{v_{rel}^2}{2a_{x,max}}$$

Warning-critical distance ($d_w$):

$$d_w = v_{rel} \cdot t_{thinking} + v_{rel} \cdot t_{brake} - \frac{v_{rel}^2}{2a_{x,max}}$$

Here, $d_w$ is a distance at which two vehicles stop due to contact between bumpers of the two vehicles when the two vehicles start at the distance and decelerate to a maximum degree and, in this regard, when the distance between the two vehicles is greater than $d_w$, this may indicate that the warning index may have a positive value and a current situation is safe.

Longitudinal collision risk index ($I_{long}$):

$$I_{long} = \max\left(\frac{|x_{max} - x_p|}{|x_{max} - x_{th}|}, \frac{|TTC^{-1}|}{|TTC_{th}^{-1}|}\right)$$

| Variable | Description |
| --- | --- |
| $v_{rel}$ | Longitudinal relative velocity of vehicles |
| $p_{long}$ | Clearance between two vehicles |
| $t_{brake}$ | System delay of break-system hardware |
| $a_{x,\,max}$ | Longitudinal maximum deceleration of vehicle |
| $t_{thinking}$ | Delay in human response between recognition and manipulation |
| $x_{max}$ | Maximum value of the warning index |
| $x_{th}$ | Threshold value of warning index |
| $TTC_{th}^{-1}$ | Threshold value of $TTC^{-1}$ |

When calculating the lateral collision risk index, the information generator may calculate time to lane crossing (TLC) based on a lateral position of another vehicle and lateral relative velocity of another vehicle and may calculate a lateral collision risk index based on time to lane crossing (TLC), a longitudinal collision risk index, and a preset threshold value of time to lane crossing (TLC).

Here, when presetting the threshold value of time to lane crossing (TLC), the information generator may set the threshold value corresponding to a condition in which another vehicle is driven at low velocity equal to or less than about, for example, 10 kph.

When presetting the threshold value of the time to lane crossing (TLC), the information generator may set the threshold value of the time to lane crossing (TLC) to a smaller threshold value than the threshold value of the time to collision (TTC).

For example, the information generator may preset the threshold value of the time to lane crossing (TLC) to about, for example, 1.5.

The threshold value of the time to lane crossing (TLC) is set because the threshold value is more conservatively set to be lower than the threshold value of the time to collision (TTC) to identify close cut-in that largely affects lateral movement at vehicle velocity equal to or less than about, for example, 10 kph.

When calculating the lateral collision risk index, the information generator may provide information indicating that a current situation is more dangerous as the calculated lateral collision risk index approaches a value of 1 and may also provide information indicating that a current situation is safer as the calculated lateral collision risk index approaches a value of 0.

For example, as shown in FIGS. 7 and 8, the lateral collision risk index may be calculated according to the following expressions.

Time to lane crossing (TLC):

$$TLC = \frac{y}{v_y}$$

Lateral collision risk index:

$$I_{lat} = \min(I_{long,p}, 1) \cdot \min\left(\frac{TLC_{th}}{TLC}, 1\right)$$

Here, $I_{lat}$ may have a value between about 0 and 1 and, as a value of the lateral collision risk index approaches 1, this means that a current situation is dangerous.

FIG. 7 is a diagram showing a lateral collision risk index in a cut-in situation. FIG. 8 is a diagram showing a lateral collision risk index in a driving situation. As seen from FIG. 7, the lateral collision risk index is increased to 1 in a cut-in situation but, in the driving situation shown in FIG. 8, the lateral collision risk index is maintained at a relatively low value.

FIG. 9 is a diagram for explanation of generation of a feature combination of the feature combination device of FIG. 1.

As shown in FIG. 9, the feature combination generator according to the present disclosure may extract a plurality of features based on sensor fusion information, estimated vehicle state information, and risk determination information and may combine the extracted features to generate a plurality of feature combinations.

Here, when extracting the plurality of features, the feature combination generator 200 may extract features including lateral position (y) of a fusion track, longitudinal position (x) of the fusion track, a heading angle (θ) of a corner radar track, and absolute velocity of the corner radar track from the sensor fusion information, may extract features including an estimated value ($v_y^j$) of lateral relative velocity of the corner radar track and an estimated value ($v_x^j$) of longitudinal relative velocity of the corner radar track from the estimated vehicle state information, and may extract features including time to collision (TTC), longitudinal collision risk index ($I_{long}$), time to lane crossing (TLC), and lateral collision risk index ($I_{lat}$) from the risk determination information.

When the feature combination generator 200 generates a plurality of feature combinations, feature combinations may include different numbers of features.

For example, the number of feature combinations may be changed depending on a total number of the extracted features.

As shown in FIG. 9, it may be necessary to select a factor corresponding to each axis to be used to learn a support vector machine (SVM) as a classifier and a feature may be extracted using an output and an estimated value (j) of the fusion track and a risk factor as follows.

Ex.) Feature:

$$\mathcal{F} = \{y, x, v_y^j, v_x^j, \theta, I_{lat}, V, TTC, TLC, I_{long}\} = \mathcal{R}^H$$

In addition, with regard to a combination of features, a combination corresponding to each axis of a support vector machine (SVM) may be generated depending on the number of features according to the following expression.

$$N = \Sigma_{i=1H}{}^H C_i$$

Then, the classification learner may classify and learn a plurality of feature combinations depending on a weight factor.

For example, the classification learner may use a soft margin support vector machine as a classifier and may use a feature candidate (Pi) as a factor of the support vector machine (SVM) for classification learning.

In addition, a weight factor λ may be a tuning parameter which means that a support vector machine (SVM) applies a weight factor to any side of maximization of a clearance between different data and allowance of a degree by which learning data deviates from each class.

FIG. 10 is a diagram for explanation of selection of an optimum feature combination of the vehicle intention determination device of FIG. 1.

As shown in FIG. 10, the vehicle intention determination device may determine intention of a surrounding vehicle based on a result value of classification learning to select an optimum feature combination corresponding to identification of a close cut-in vehicle and may determine a situation of the close cut-in vehicle based on the selected optimum feature combination.

Here, when selecting the optimum feature combination corresponding to identification of the close cut-in vehicle, the vehicle intention determination device may determine intention of a surrounding vehicle based on the result value of classification learning, may calculate accuracy of close cut-in with respect to the determined intention of the surrounding vehicle, may select an optimum feature combination based on the calculated accuracy, and may determine a situation of the close cut-in situation based on a weight factor included in the selected optimum feature combination.

For example, when calculating the accuracy of close cut-in with respect to intention of the surrounding vehicle, the vehicle intention determination device may calculate the accuracy based on a true positive rate (TPR) and a false positive rate (FPR).

When selecting the optimum feature combination based on the calculated accuracy, the vehicle intention determination device may select a feature combination with a high true positive rate (TPR) and a low false positive rate (FPR).

According to the present disclosure, as shown in FIG. 10, it may be possible to select an optimum feature combination (with a high TPR and a low FPR) and a weight factor via confirmation of performance based on a combination of features.

Figure 11:
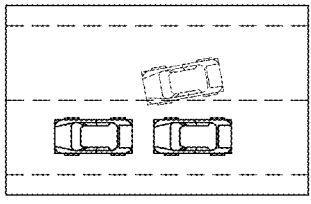
Figure 12:
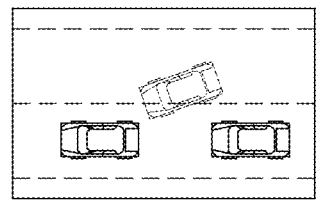

FIGS. 11 through 13 are diagrams for explanation of selection of an optimum feature combination depending on a close cut-in situation.

As shown in FIGS. 11 through 13, according to the present disclosure, when a maneuver of a surrounding vehicle is determined using a machine learning method in situations of tight cut-in, loose cut-in, and mild cut-in of a vehicle at low velocity, it may be possible to select a required optimum feature combination and a classifier parameter.

As shown in FIG. 11, the tight cut-in situation may refer to a situation in which another vehicle cuts in around a head lamp of a subject vehicle when a clearance between a front vehicle and the subject vehicle is small.

That is, the tight cut-in situation may refer to a situation in which traffic congestion is serious and may refer to a situation in which another vehicle stops around a head lamp of a subject vehicle to cut in due to a narrow space between a front vehicle and the subject vehicle.

In this case, velocity at which another vehicle approaches a subject vehicle to cut in is low and a space for rotation of another vehicle is insufficient and, thus, a state value such as a position, velocity, and a heading angle is small and a variation amount may also be small.

A clearance between another vehicle and a subject vehicle is small and, thus, even if a size of a position or relative velocity is small, a risk factor may be calculated to be high.

Accordingly, according to the present disclosure, in the case of a tight cut-in situation, cut-in may be identified using a feature combination including a risk index.

As shown in FIG. 12, the loose cut-in situation refers to a situation in which another vehicle cuts in around a front vehicle when a clearance between the front vehicle and the subject vehicle is large.

That is, the loose cut-in situation refers to a situation in which another vehicle approaches and stops at higher velocity than in the tight cut-in situation to cut in because a clearance between the front vehicle and the subject vehicle is large.

In this case, another vehicle cuts in to be close to the front vehicle and, thus, a change in a heading angle is small but a change in position and velocity may be large.

Accordingly, according to the present disclosure, in the case of the loose cut-in situation, cut-in may be identified using a feature combination including a large amount of positions and relative velocity.

Then, as shown in FIG. 13, the mild cut-in may refer to a situation in which another vehicle cuts in a space between the subject and a front vehicle when a clearance between the front vehicle and the subject vehicle is large.

That is, the mild cut-in situation is a situation in which another vehicle approaches and stops at higher velocity than in the tight cut-in situation to cut in because a clearance between the front vehicle and the subject vehicle is large.

In this case, another vehicle cuts in between the front vehicle and the subject vehicle and, thus, a change in heading angle may be largest.

Accordingly, according to the present disclosure, in the case of the mild cut-in situation, cut-in may be identified using a feature combination including a heading angle.

Figure 14:
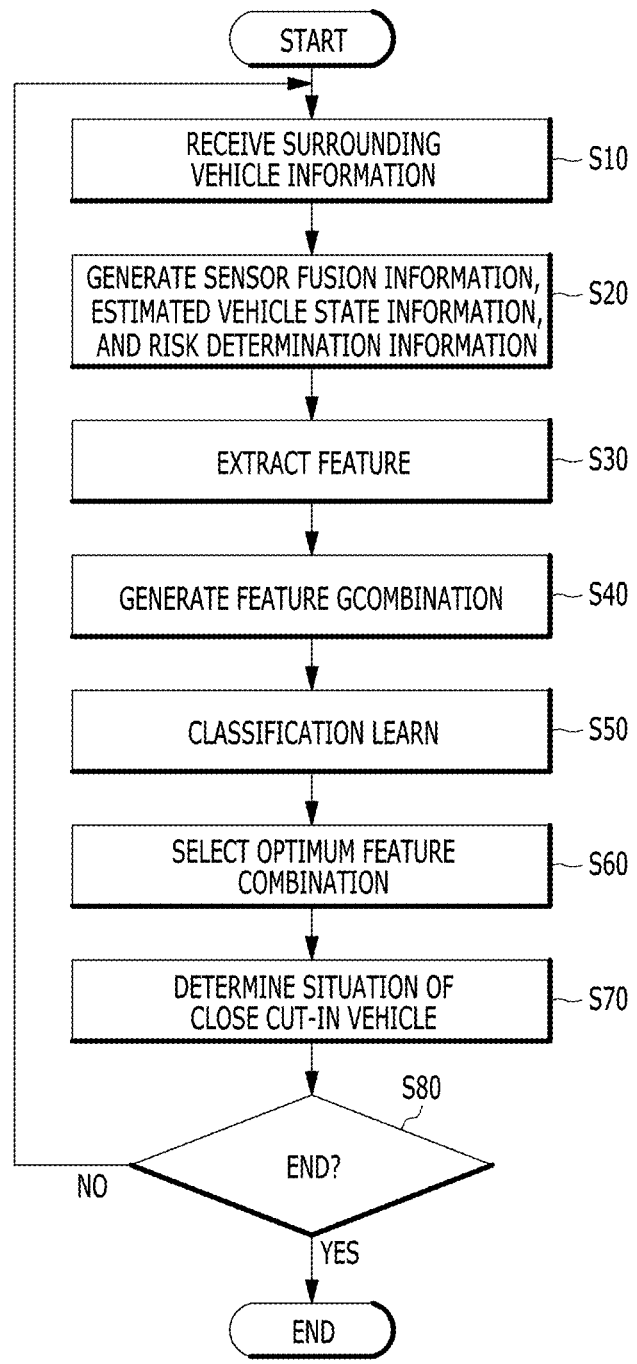
FIG. 14 is a flowchart for explanation of a method of identifying a close cut-in vehicle according to the present disclosure.

FIG. 14 is a flowchart for explanation of a method of identifying a close cut-in vehicle according to the present disclosure.

As shown in FIG. 14, according to the present disclosure, surrounding vehicle information may be received (S10).

Here, according to the present disclosure, when the surrounding vehicle information is received, surrounding vehicle information including track information may be received from a front radar for sensing a front side of a subject vehicle and surrounding vehicle information including track information and free space information may be received from a corner radar for sensing a corner side of the subject vehicle.

According to the present disclosure, when the surrounding vehicle information is received, sensor fusion information, estimated vehicle state information, and risk determination information may be generated based on the received surrounding vehicle information (S20).

Here, according to the present disclosure, when the sensor fusion information is generated, first sensor fusion information obtained via fusion of front radar track information and corner radar track information of the surrounding vehicle information and second sensor fusion information obtained via fusion of front radar track information, corner radar track information, and corner radar free space information of the surrounding vehicle information may be generated.

According to the present disclosure, when the first sensor fusion information is generated, a position of a corner radar track may be verified based on a position of a front radar track, the position of the corner radar track may be corrected toward the position of the front radar track to calculate a fusion track, and the first sensor fusion information including the calculated fusion track may be generated.

Here, the first sensor fusion information may include a lateral position of a fusion track, a longitudinal position of the fusion track, lateral relative velocity of the fusion track, longitudinal relative velocity of the fusion track, a heading angle of the corner radar track, a width of the fusion track, a length of the fusion track, and absolute velocity of the corner radar track.

According to the present disclosure, when the second sensor fusion information is generated, the fusion track may be calculated via fusion of the free space and the corner radar track and the second sensor fusion information including the calculated fusion track may be generated.

Here, according to the present disclosure, during fusion of the free space and the corner radar track, fusion may be performed based on a particle filter.

The second sensor fusion information may include a lateral position of a fusion track, a longitudinal position of the fusion track, lateral relative velocity of the fusion track, longitudinal relative velocity of the fusion track, a heading angle of the corner radar, a width of the corner radar track, and a length of the corner radar track.

Then, according to the present disclosure, when the estimated vehicle state information is generated, lateral relative velocity of the corner radar track and longitudinal relative velocity of the corner radar track may be estimated to calculate an estimated value and the estimated vehicle state information including the calculated estimated value may be generated.

Here, according to the present disclosure, when lateral relative velocity of the corner radar track and longitudinal relative velocity of the corner radar track are estimated, estimation may be performed based on the Kalman filter to calculate the estimated value.

In this case, the estimated vehicle state information may include an estimated value of the lateral relative velocity of the corner radar track and an estimated value of the longitudinal relative velocity of the corner radar track.

According to the present disclosure, when the estimated vehicle state information is generated, if surrounding vehicle state information is not received or surrounding vehicle state information including noise is received, the estimated vehicle state information may be generated.

Then, according to the present disclosure, when the risk determination information is generated, a longitudinal collision risk index may be calculated based on time to collision (TTC) and a warning index, a lateral collision risk index may be calculated based on time to lane crossing (TLC) and the longitudinal collision risk index, and may generate risk determination information including the calculated longitudinal collision risk index and lateral collision risk index.

Here, according to the present disclosure, when the longitudinal collision risk index is calculated, time to collision (TTC) may be calculated based on a clearance between a subject vehicle and another vehicle and longitudinal relative velocity of another vehicle, the warning index may be calculated based on the clearance between the two distances, a brake threshold distance, and a warning threshold distance, and the longitudinal collision risk index may be calculated based on the calculated time to collision (TTC) and warning index, and a preset threshold value of time to collision (TTC) and a maximum value of a warning index.

In this case, according to the present disclosure, when the warning index is calculated, if the clearance between the two vehicles is greater than a warning threshold distance, the warning index may be calculated as a positive value to provide information indicating that a current situation is safe.

For example, the threshold value of time to collision (TTC) may be set to a threshold value corresponding to a condition in which another vehicle travels at low velocity equal to or less than about, for example, 10 kph and a maximum value of the warning index may be set to a maximum value of the warning index in such a way that a variation rate of a longitudinal collision risk index corresponding to a variation rate of the warning index is greater than a reference value.

According to the present disclosure, when the lateral collision risk index is calculated, time to lane crossing (TLC) may be calculated based on a lateral position of another vehicle and lateral relative velocity of another vehicle, and a lateral collision risk index may be calculated based on the time to lane crossing (TLC), the longitudinal collision risk index, and a preset threshold value of the time to lane crossing (TLC).

For example, the threshold value of the time to lane crossing (TLC) may be set to a threshold value corresponding to a condition in which another vehicle is driven at low velocity equal to or less than about, for example, 10 kph, and the threshold value of the time to lane crossing (TLC) may be set to a smaller threshold value than the threshold value of the time to collision (TTC).

According to the present disclosure, when the lateral collision risk index is calculated, information indicating that a current situation is more dangerous as the calculated lateral collision risk index approaches a value of 1 may be provided and information indicating that a current situation is safer as the calculated lateral collision risk index approaches a value of 0 may also be provided.

Then, according to the present disclosure, a plurality of features may be extracted based on the sensor fusion information, the estimated vehicle state information, and the risk determination information (S30).

Here, according to the present disclosure, when the plurality of features is extracted, features including a lateral position of fusion track, a longitudinal position of the fusion track, a heading angle of a corner radar, and absolute velocity of corner radar track may be extracted from the sensor fusion information, features including an estimated value of lateral relative velocity of corner radar track and an estimated value of longitudinal relative velocity of corner radar track may be extracted from estimated vehicle state information, and features including time to collision (TTC), longitudinal collision risk index, time to lane crossing (TLC), and the lateral collision risk index may be extracted from the risk determination information.

According to the present disclosure, the extracted features may be combined to generate a plurality of feature combinations (S40).

Here, when a plurality of feature combinations is generated, feature combinations may include different numbers of feature.

Here, the number of feature combinations may be changed depending on a total number of the extracted features.

Then, according to the present disclosure, a plurality of feature combinations may be classified and learned depending on a weight factor (S50).

Then, according to the present disclosure, intention of a surrounding vehicle may be determined based on a result value of classification learning to select an optimum feature combination corresponding to identification of a close cut-in vehicle (S60).

Here, according to the present disclosure, when the optimum feature combination corresponding to identification of the close cut-in vehicle is selected, intention of a surrounding vehicle may be determined based on the result value of classification learning, accuracy of close cut-in may be calculated with respect to the determined intention of the surrounding vehicle, an optimum feature combination based on the calculated accuracy may be selected, and a situation of the close cut-in situation may be determined based on a weight factor included in the selected optimum feature combination.

For example, according to the present disclosure, when the accuracy of close cut-in is calculated with respect to intention of the surrounding vehicle, the accuracy may be calculated based on a true positive rate (TPR) and a false positive rate (FPR).

According to the present disclosure, when the optimum feature combination is selected based on the calculated accuracy, a feature combination with a high true positive rate (TPR) and a low false positive rate (FPR) may be selected.

According to the present disclosure, a situation of the close cut-in vehicle may be determined based on the selected optimum feature combination (S70).

Then, according to the present disclosure, whether there is a termination request may be verified (S80) and, when there is a termination request, a procedure of identification of the close cut-in vehicle may be terminated.

According to the present disclosure, a computer readable recording medium for storing a program for execution of a method of identifying close cut-in of a close cut-in vehicle identification apparatus may perform procedures provided in a method of identifying close cut-in according to an embodiment of the present disclosure.

A vehicle according to an embodiment of the present disclosure may include a sensing device for sensing a surrounding vehicle and a close cut-in vehicle device for identifying a close cut-in vehicle based on the surrounding vehicle information received from the sensing device and, in this case, the close cut-in vehicle device may generate sensor fusion information, estimated vehicle state information, and risk determination information based on the received surrounding vehicle information, may extract a plurality of features based on the sensor fusion information, the estimated vehicle state information, and the risk determination information, may combine the extracted features to generate a plurality of feature combinations, may classify and learn a plurality of feature combinations depending on a weight factor, may determine intention of a surrounding vehicle based on a result value of classification learning to select an optimum feature combination corresponding to identification of the close cut-in vehicle, and may determine a situation of the close cut-in vehicle based on the selected optimum feature combination.

As such, according to the present disclosure, an optimum feature combination for identification of a close cut-in vehicle may be selected to accurately determine various situations based on the selected optimum feature combination with respect to another vehicle that cuts in at a short distance during low-velocity driving, preventing collision and enhancing safety.

According to the present disclosure, when a maneuver of a surrounding vehicle is determined using a machine learning method in situations of tight cut-in, loose cut-in, and mild cut-in of a vehicle at low velocity, it may be possible to select a required optimum feature combination and a classifier parameter.

Here, the tight cut-in situation may refer to a situation in which another vehicle cuts in around a head lamp of a subject vehicle when a clearance between a front vehicle and the subject vehicle is small, the loose cut-in situation may refer to a situation in which another vehicle cuts in around a front vehicle when a clearance between a front vehicle and the subject vehicle is large, and the mild cut-in situation may refer to a situation in which another vehicle cuts in between the subject vehicle and a front vehicle when a clearance between the front vehicle and the subject vehicle is large.

According to the present disclosure, even if an algorithm of a sensor fusion module, an estimation module, and a risk determination module of an entire system configuration are changed, it may be possible to apply the proposed framework.

According to a close cut-in vehicle identification apparatus, an apparatus and a method for identifying a close cut-in vehicle, and a vehicle using the method related to at least one embodiment of the present disclosure, an optimum feature combination for identification of a close cut-in vehicle may be selected to accurately determine various situations based on the selected optimum feature combination with respect to another vehicle that cuts in at a short distance during low-velocity driving, preventing collision and enhancing safety.

According to the present disclosure, when a maneuver of a surrounding vehicle is determined using a machine learning method in situations of tight cut-in, loose cut-in, and mild cut-in of a vehicle at low velocity, it may be possible to select a required optimum feature combination and a classifier parameter.

Here, the tight cut-in situation may refer to a situation in which another vehicle cuts in around a head lamp of a subject vehicle when a clearance between a front vehicle and the subject vehicle is small, the loose cut-in situation may refer to a situation in which another vehicle cuts in around a front vehicle when a clearance between a front vehicle and the subject vehicle is large, and the mild cut-in situation may refer to a situation in which another vehicle cuts in between the subject vehicle and a front vehicle when a clearance between the front vehicle and the subject vehicle is large According to the present invention, even if an algorithm of a sensor fusion module, an estimation module, and a risk determination module of an entire system configuration are changed, it may be possible to apply the proposed framework.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

The various embodiments disclosed herein, including embodiments of the close cut-in vehicle identification apparatus and/or elements thereof including, but not limited to, the information generation generator 100, the feature combination generation generator 200, the classification learning learner 300, and the vehicle intention determination device 400, can be implemented using one or more processors coupled to a memory (or other non-transitory computer readable recording medium) storing computer-executable instructions and/or algorithm for causing the processor(s) to perform the operations and/or functions described above in relation to the information generation generator 100, the feature combination generation generator 200, the classification learning learner 300, and the vehicle intention determination device 400. The aforementioned present disclosure can also be embodied as computer readable code stored on a non-transitory, or transitory, computer readable recording medium. The computer readable recording medium is any data storage device that can store data which can thereafter be read and executed by a computer and/or a processor to perform the above described operations. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the present disclosure. Thus, it is intended that the present disclosure cover the modifications and variations of this disclosure provided they come within the scope of the appended claims and their equivalents.

What is claimed is:

1. A close cut-in vehicle identification apparatus comprising:
    an information generator configured to generate sensor fusion information, estimated vehicle state information, and risk determination information based on surrounding vehicle information, upon receiving the surrounding vehicle information;
    a feature combination generator configured to extract a plurality of features based on the sensor fusion information, the estimated vehicle state information, and the risk determination information and to combine the extracted features to generate a plurality of feature combinations;
    a classification learner configured to classify and learn the plurality of feature combinations depending on a weight factor; and
    a vehicle intention determination device configured to determine intention of a surrounding vehicle based on a classification learning result value provided by the classification learner to select an optimum feature combination corresponding to identification of the close cut-in vehicle and configured to determine a situation of the close cut-in vehicle based on the selected optimum feature combination.

2. The close cut-in vehicle identification apparatus of claim 1, wherein the information generator receives surrounding vehicle information from a front radar for sensing a front side of a subject vehicle and a corner radar for sensing a corner side of the subject vehicle when receiving the surrounding vehicle information.

3. The close cut-in vehicle identification apparatus of claim 2, wherein the information generator receives surrounding vehicle information including track information from the front radar and receives surrounding vehicle information including track information and free space information from the corner radar, when receiving the surrounding vehicle information.

4. The close cut-in vehicle identification apparatus of claim 1, wherein the information generator generates first sensor fusion information obtained via fusion of front radar track information and corner radar track information of the surrounding vehicle information and second sensor fusion information obtained via fusion of front radar track information, corner radar track information, and corner radar free space information of the surrounding vehicle information, when generating the sensor fusion information.

5. The close cut-in vehicle identification apparatus of claim 4, wherein the information generator verifies a position of a corner radar track based on a position of a front radar track, corrects the position of the corner radar track toward the position of the front radar track to calculate a fusion track, and generates the first sensor fusion information including the calculated fusion track, when generating the first sensor fusion information.

6. The close cut-in vehicle identification apparatus of claim 4, wherein the information generator calculates a fusion track via fusion of a free space and a corner radar track and generates the second sensor fusion information including the calculated fusion track, when generating the second sensor fusion information.

7. The close cut-in vehicle identification apparatus of claim 1, wherein the information generator estimates lateral relative velocity of a corner radar track and longitudinal relative velocity of the corner radar track to calculate an estimated value and generates the estimated vehicle state information including the calculated estimated value, when generating the estimated vehicle state information.

8. The close cut-in vehicle identification apparatus of claim 1, wherein the information generator generates the estimated vehicle state information when the information generator does not receive surrounding vehicle state information or receives surrounding vehicle state information including nose, when generating the estimated vehicle state information.

9. The close cut-in vehicle identification apparatus of claim 1, wherein the information generator calculates a longitudinal collision risk index based on time to collision (TTC) and a warning index, calculates a lateral collision risk index based on time to lane crossing (TLC) and a longitudinal collision risk index, and generates the risk determination information including the calculated longitudinal collision risk index and lateral collision risk index, when generating the risk determination information.

10. The close cut-in vehicle identification apparatus of claim 1, wherein the feature combination generator extracts a lateral position of a fusion track, a longitudinal position of the fusion track, a heading angle of a corner radar, and absolute velocity of a corner radar track from the sensor fusion information, extracts features including an estimated value of lateral relative velocity of a corner radar track and an estimated value of longitudinal relative of the corner radar track from the estimated vehicle state information, and extracts features including time to collision (TTC), a longitudinal collision risk index, time to lane crossing (TLC), and a lateral collision risk index from the risk determination information, when extracting the plurality of features.

11. The close cut-in vehicle identification apparatus of claim 1, wherein the vehicle intention determination device determines intention of the surrounding vehicle based on the classification learning result value, calculates accuracy of close cut-in with respect to the determined intention of the surrounding vehicle, selects an optimum feature combination based on the calculated accuracy, and determines a situation of the close cut-in vehicle based on a weight factor included in the selected optimum feature combination, when selecting an optimum feature combination corresponding to identification of the close cut-in vehicle.

12. A method of identifying a close cut-in vehicle of a close cut-in vehicle identification apparatus, the method comprising:
receiving surrounding vehicle information;
upon receiving the surrounding vehicle information, generating sensor fusion information, estimated vehicle state information, and risk determination information based on the received surrounding vehicle information;
generating a plurality of features based on the sensor fusion information, the estimated vehicle state information, and the risk determination information;
combining the extracted features to generate a plurality of feature combinations;
classifying and learning the plurality of feature combinations depending on a weight factor;
determining intention of a surrounding vehicle based on a classification learning result value to select an optimum feature combination corresponding to identification of a close cut-in vehicle; and
determining determine a situation of the close cut-in vehicle based on the selected optimum feature combination.

13. The method of claim 12, wherein the receiving of the surrounding vehicle information includes receiving surrounding vehicle information including track information from a front radar for sensing a front side of a subject vehicle and receiving surrounding vehicle information including track information and free space information from a corner radar for sensing a corner side of the subject vehicle.

14. The method of claim 12, wherein the generating of the sensor fusion information includes generating first sensor fusion information obtained via fusion of front radar track information and corner radar track information of the surrounding vehicle information and second sensor fusion information obtained via fusion of front radar track information, corner radar track information, and corner radar free space information of the surrounding vehicle information.

15. The method of claim 12, wherein the generating of the estimated vehicle state information includes estimating lateral relative velocity of a corner radar track and longitudinal relative velocity of the corner radar track to calculate an estimated value and generating the estimated vehicle state information including the calculated estimated value.

16. The method of claim 12, wherein the generating of the estimated vehicle state information includes generating the estimated vehicle state information when surrounding vehicle state information is not received or surrounding vehicle state information including noise is received.

17. The method of claim 12, wherein the generating of the risk determination information includes calculating a longitudinal collision risk index based on time to collision (TTC) and a warning index, calculating a lateral collision risk index based on time to lane crossing (TLC) and a longitudinal collision risk index, and generating the risk determination information including the calculated longitudinal collision risk index and lateral collision risk index.

18. The method of claim 12, wherein the extracting of the plurality of features includes extracting a lateral position of a fusion track, a longitudinal position of the fusion track, a heading angle of a corner radar, and absolute velocity of a corner radar track from the sensor fusion information, extracting features including an estimated value of lateral relative velocity of a corner radar track and an estimated value of longitudinal relative of the corner radar track from the estimated vehicle state information, and extracting features including time to collision (TTC), a longitudinal collision risk index, time to lane crossing (TLC), and a lateral collision risk index from the risk determination information.

19. The method of claim 12, wherein the selecting of the optimum combination corresponding to identification of the close cut-in vehicle includes determining intention of the surrounding vehicle based on the classification learning result value, calculating accuracy of close cut-in with respect to the determined intention of the surrounding vehicle, selecting an optimum feature combination based on the calculated accuracy, and determining a situation of the close cut-in vehicle based on a weight factor included in the selected optimum feature combination.

20. A vehicle comprising:
a sensing device configured to sense a surrounding vehicle; and
a close cut-in vehicle device configured to identify a close cut-in vehicle based on surrounding vehicle information received from the sensing device,
wherein the close cut-in vehicle device generates sensor fusion information, estimated vehicle state information, and risk determination information based on the received surrounding vehicle information, extracts a plurality of features based on the sensor fusion information, the estimated vehicle state information, and the risk determination information, combines the extracted features to generate a plurality of feature combinations, classifies and learns the plurality of feature combinations depending on a weight factor, determines intention of a surrounding vehicle based on a classification learning result value to select an optimum feature combination corresponding to identification of the close cut-in vehicle, and determines a situation of the close cut-in vehicle based on the selected optimum feature combination.

* * * * *